C. A. DILLON.

VACUUM CLEANER.

APPLICATION FILED NOV. 28, 1911.

Reissued Jan. 9, 1912.

13,352.

2 SHEETS—SHEET 1.

Witnesses

R. H. Kohl

Ruth C. Miller

Inventor

Charles A. Dillon

By Harry Grease

Attorney

C. A. DILLON.

VACUUM CLEANER.

APPLICATION FILED NOV. 28, 1911.

Reissued Jan. 9, 1912.

13,352.

2 SHEETS—SHEET 2.

Witnesses

R. J. Kohl

Ruth A. Miller

Inventor

Charles A Dillon

By

Harry Grease Attorney

UNITED STATES PATENT OFFICE.

CHARLES A. DILLON, OF CANTON, OHIO, ASSIGNOR TO THE UNITED ELECTRIC COMPANY, OF CANTON, OHIO, A CORPORATION OF OHIO.

VACUUM-CLEANER.

13,352. Specification of Reissued Letters Patent. Reissued Jan. 9, 1912.

Original No. 1,005,005, dated October 3, 1911, Serial No. 617,983. Application for reissue filed November 28, 1911. Serial No. 662,938.

*To all whom it may concern:*

Be it known that I, CHARLES A. DILLON, a citizen of the United States, residing at Canton, in the county of Stark and State of Ohio, have invented certain new and useful Improvements in Vacuum-Cleaners, of which the following is a specification.

The invention relates to vacuum cleaners including an electric motor, a suction fan and a separating chamber communicating with a plurality of inlet openings adapted to communicate with the tubular shanks of suction nozzles. Such machines are designed and sold for the use of one or two or some other particular number of suction nozzles at the same time, and it is desirable for practical reasons to construct the fan with a greater capacity than necessary to create the proper suction in the shanks of the particular number of nozzles which may be used; and it is also desirable for economy to make the motor with only a little greater capacity than necessary to create such suction. In the operation of these machines difficulty has been experienced when more than the particular number of inlet openings have been purposely or accidentally used or opened at the same time, growing out of the fact that the work of the fan and the load on the motor will be so increased as to burn out the motor. This difficulty is overcome by providing a partition between the fan chamber and the inlet openings with an orifice therein of substantially the same cross area as the combined cross areas of the openings in the particular number of suction nozzles which may be used, thus limiting the amount of air which can be drawn into the fan to the amount of air which may properly be drawn through the shanks of such particular nozzles.

The invention, thus described, as embodied in a stationary vacuum cleaner, is illustrated in the accompanying drawings, forming part hereof, in which—

Figure 1:
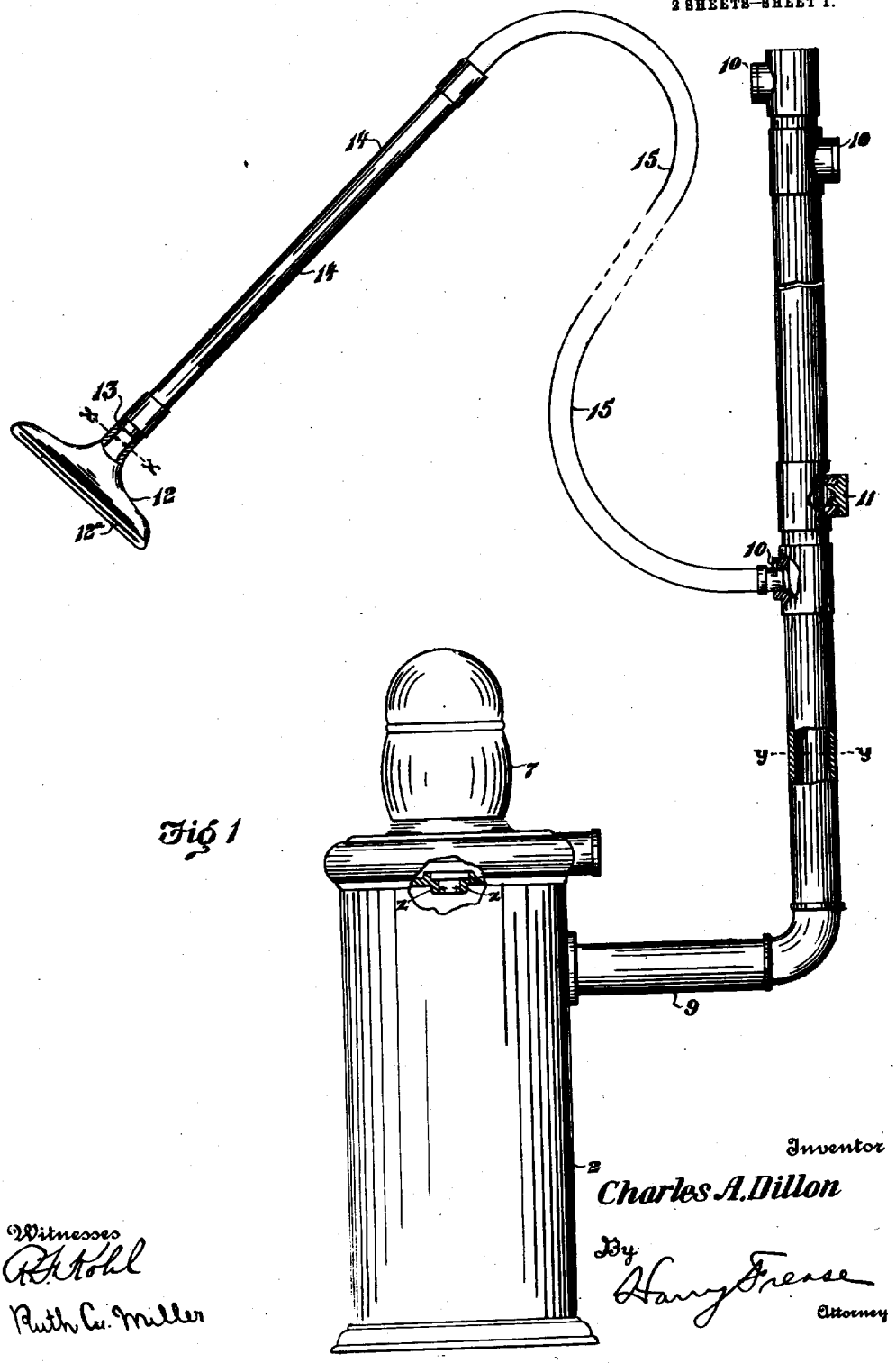
Figure 2:
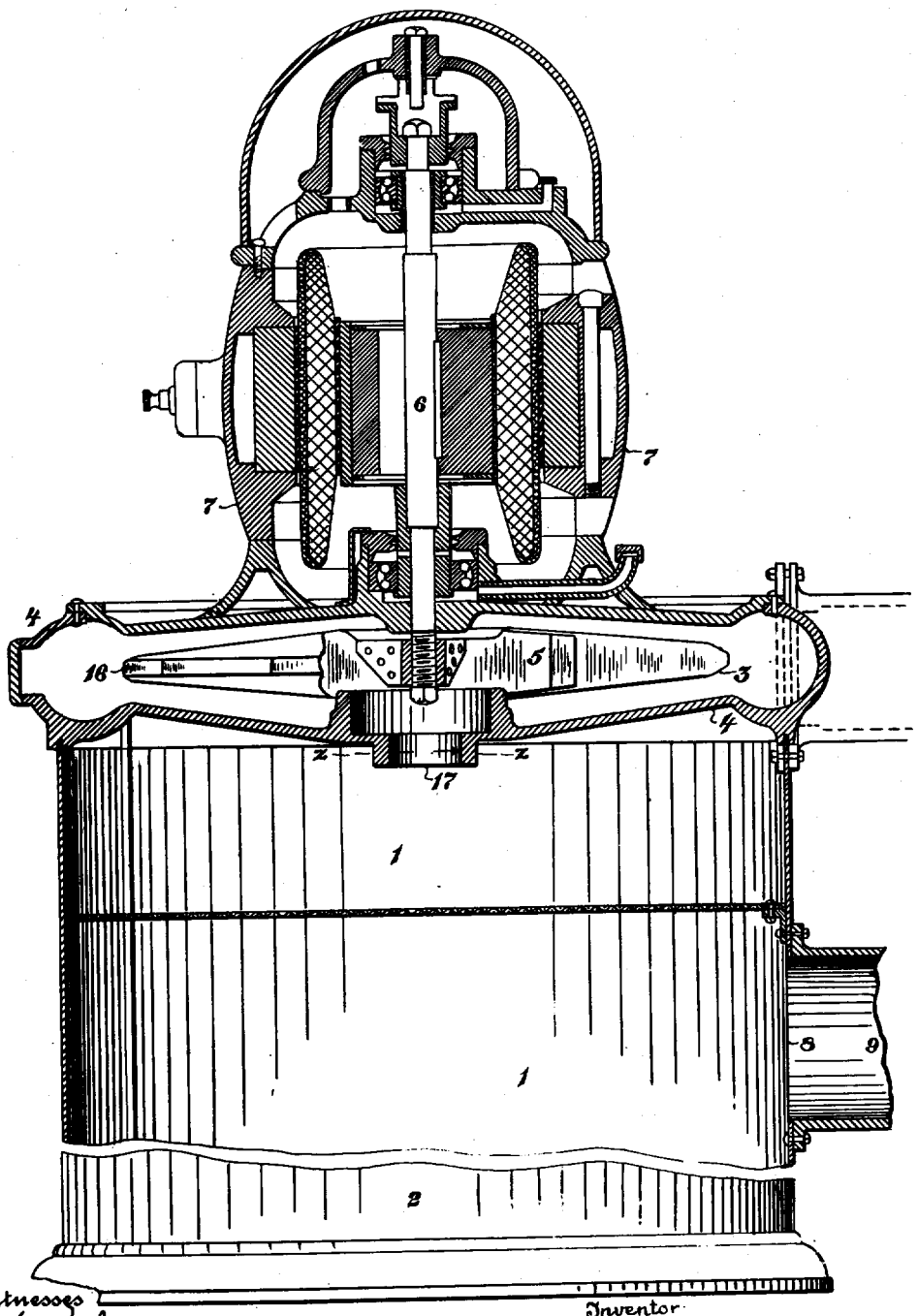

Figure 1 is a side elevation of the vacuum cleaning machine, with some parts broken away to show interior details; and Fig. 2, an elevation section of the electric motor, the fan blower and the upper part of the separating chamber.

Similar numerals refer to similar parts throughout the drawings.

The machine includes the separating chamber 1 within the cylindric case 2, the fan chamber 3 within the blower case 4, and the fan 5 located in the fan chamber and secured on the lower end of the spindle 6 of the electric motor 7 which is secured on the blower case.

The inlet opening 8 of the collecting-chamber is provided in the cylindric case 2, and communicates with the main conduit 9 which is preferably extended inward or adjacent to the wall of a building (not shown), and is provided with a plurality of inlet openings 10 normally closed by the valves 11, for use in cleaning the various apartments of the building. One or more suction nozzles, as 12, are provided, and the tubular shanks 13 thereof are preferably extended as by the tubular handle 14 and the flexible tube 15; and the free ends of the flexible tubular extensions are adapted to be entered into or otherwise connected with one of the inlet openings 10 when the valve thereof is open or removed; whereby the nozzle communicates with the collecting chamber through said conduit.

The cross areas as at $x$—$x$ of the opening in the shank of each nozzle is suitably proportioned to the area of the opening of the inlet slot $12^a$ of the nozzle to properly perform the work thereof, and substantially the same size of opening prevails throughout the nozzle-shank, the tubular extensions thereof, and the communicating inlet opening. The cross area as at $y$—$y$ of the main conduit is preferably made much larger than the combined cross areas of the openings in the particular number of nozzle shanks designed to be operated at one time, which enlargement is made for the purpose of decreasing the resistance and friction caused by the flow of air through the main conduit, the same being generally extended a considerable distance from the machine to the various inlet openings. For the purpose of reducing frictional resistance in the fan 5 at the speed adopted for operating the machine, the same is likewise made considerably larger in capacity, that is, the peripheral outlet slot 16 is widened to make a considerably larger outlet area than the combined areas of the openings in the shanks of the particular number of nozzles to be used at the same time; and this slot is so widened for the further purpose of freely passing articles of refuse which may be drawn through the fan and which would otherwise lodge in and clog the slot. And the motor 7 is designed and adapted to normally rotate the fan at the adopted rate of speed, and at such speed of rotation to properly perform the work necessary to create the proper vacuum or suction in the tubular shanks of the particular number of nozzles which may be properly used.

The orifice 17 which constitutes the inlet to the fan chamber is provided in the partition separating this chamber from the collecting-chamber, and, for the purpose of this invention, the cross area, as at *z—z*, of this orifice, is made substantially equal to the combined cross areas of the openings of the particular number of nozzles designed to be used at one time; so that the fan can only take in the amount of air which properly passes through the shanks of such particular number of nozzles, and, therefore, the capacity of the motor cannot be overloaded to injure or to burn it out.

I claim:

1. A vacuum cleaner including a separating chamber having a plurality of valved inlet-openings communicating therewith, suction nozzles having tubular shanks adapted to be connected with the inlet-openings, a suction fan having a capacity greater than that required for the combined cross-areas of a particular number of nozzle shanks, a motor connected with the fan having a capacity substantially equal to the requirements of said particular number of nozzle-shanks, and a partition between the separating-chamber and the fan having an orifice therein with a cross-area substantially equal to the combined cross-areas of said particular number of nozzle-shanks.

2. A vacuum cleaner including a separating chamber having a plurality of valved inlet-openings communicating therewith, suction nozzles having tubular shanks adapted to be connected with the inlet-openings, a suction fan having a capacity greater than that required for the combined cross-areas of a particular number of nozzle-shanks, a motor connected with the fan having a capacity substantially equal to the requirements of said particular number of nozzle-shanks, and a partition between the inlet-openings and the fan having an orifice therein with a cross-area substantially equal to the combined cross-areas of said particular number of nozzle-shanks.

3. A vacuum cleaner including a separating chamber with a communicating conduit having a plurality of valved inlet openings therein, suction nozzles having tubular shanks adapted to be connected with the inlet-openings, a suction fan having a capacity greater than that required for the combined cross-areas of a particular number of nozzle-shanks, a motor connected with the fan having a capacity substantially equal to the requirements of said particular number of nozzle-shanks, and a partition between the separating-chamber and the fan having an orifice therein with a cross-area substantially equal to the combined cross-areas of said particular number of nozzle shanks.

4. A vacuum cleaner including a separating chamber with a communicating conduit having a plurality of valved inlet openings therein, suction nozzles having tubular shanks adapted to be connected with the inlet-openings, a suction fan having a capacity greater than that required for the combined cross-areas of a particular number of nozzle-shanks, a motor connected with the fan having a capacity substantially equal to the requirements of said particular number of nozzle-shanks, and a partition between the inlet-openings and the fan having an orifice therein with a cross-area substantially equal to the combined cross-areas of said particular number of nozzle shanks.

5. A vacuum cleaner including a separating chamber with a communicating conduit having a plurality of valved inlet openings therein, suction nozzles having tubular shanks adapted to be connected with the inlet-openings, a suction fan having a capacity greater than that required for the combined cross-areas of a particular number of nozzle-shanks, a motor connected with the fan having a capacity substantially equal to the requirements of said particular number of nozzle-shanks, and a partition between the separating-chamber and the fan having an orifice therein with a cross-area substantially equal to the combined cross-areas of said particular number of nozzle shanks, the cross-area of the conduit being greater than the combined cross-areas of said particular number of nozzle-shanks.

6. A vacuum cleaner including a separating-chamber with a communicating conduit having a plurality of valved inlet openings therein, suction nozzles having tubular shanks adapted to be connected with the inlet-openings, a suction fan having a capacity greater than that required for the combined cross-areas of a particular number of nozzle-shanks, a motor connected with the fan having a capacity substantially equal to the requirements of said particular number of nozzle-shanks, and a partition between the inlet-openings and the fan having an orifice therein with a cross-area substantially equal to the combined cross-areas of said particular number of nozzle-shanks, the cross-area of the conduit being greater than the combined cross-areas of said particular number of nozzle-shanks.

7. A vacuum cleaner including a separating-chamber having a nozzle conduit communicating therewith, a suction fan adjacent to the chamber with an intervening partition having a communicating orifice therein, and a motor in operative connection with the fan; the conduit and the fan being of greater capacity than the motor, and the size of the orifice being proportioned to the capacity of the motor.

8. A vacuum cleaner including a nozzle conduit, a suction fan having a case with an inlet orifice in communication with the conduit, and a motor in operative connection with the fan; the conduit and the fan being of greater capacity than the motor, and the size of the orifice being proportioned to the capacity of the motor.

9. A vacuum cleaner including a separating-chamber, a suction fan and a motor in operative connection, there being a partition having a communicating orifice between the chamber and the fan; the fan being of greater capacity than the motor, and the size of the orifice being proportioned to the capacity of the motor.

10. A vacuum cleaner including a suction fan having a case with an inlet orifice therein, and a motor in operative connection with the fan; the fan being of greater capacity than the motor, and the orifice being proportioned to the capacity of the motor.

CHARLES A. DILLON.

Witnesses:
FERD. J. ZETTLER,
RUTH A. MILLER.